US006696960B1

(12) United States Patent
Martinez

(10) Patent No.: US 6,696,960 B1
(45) Date of Patent: Feb. 24, 2004

(54) HYDRAULIC SYSTEM WITH FLUID LEAK WARNING APPARATUS

(76) Inventor: Donald G. Martinez, P.O. Box 584, Calistoga, CA (US) 94515

(*) Notice: Subject to any disclaimer, the term of this patent is extended or adjusted under 35 U.S.C. 154(b) by 0 days.

(21) Appl. No.: 10/404,474

(22) Filed: Apr. 1, 2003

(51) Int. Cl.[7] .............................................. G08B 21/00
(52) U.S. Cl. ..................... 340/605; 340/604; 340/450.1
(58) Field of Search ................... 340/603, 604, 340/605, 606, 450, 450.1, 624; 73/40.7, 49.3, 52, 302, 308; 137/78.3, 486, 495, 624.13; 138/26, 30; 277/306, 308, 320; 200/84 C, 84 R

(56) References Cited

U.S. PATENT DOCUMENTS

| | | |
|---|---|---|
| 1,768,446 A | 6/1930 | Gron |
| 2,253,260 A | 8/1941 | Alcorn |
| 2,825,895 A | 3/1958 | Malagarie |
| 3,576,959 A | 5/1971 | Bogosoff |
| 3,673,587 A | 6/1972 | Baruch |
| 4,020,481 A | 4/1977 | Nakagawa |
| 4,057,700 A | 11/1977 | Nakashima |
| 4,591,837 A | 5/1986 | Martinez |
| 4,813,268 A * | 3/1989 | Helvey ........................ 73/40.7 |
| 5,267,736 A * | 12/1993 | Pietsch et al. ............... 277/308 |
| 5,278,749 A * | 1/1994 | De Man ................. 137/624.13 |
| 6,619,325 B2 * | 9/2003 | Gray, Jr. ....................... 138/30 |

FOREIGN PATENT DOCUMENTS

GB              315568            7/1929

* cited by examiner

Primary Examiner—Van Trieu
(74) Attorney, Agent, or Firm—James F. Hann; Haynes Beffel & Wolfeld LLP

(57) ABSTRACT

An improved hydraulic system comprises a hydraulic fluid reservoir and a hydraulic circuit assembly comprising lines and hydraulic components. The hydraulic components comprise a hydraulic actuator comprising a cylinder, defining an interior, a reciprocating piston within the interior dividing the interior into first and second regions, and a first shaft extending from the piston, through the first region and out through a first opening in the cylinder. At least two of the hydraulic components and the reservoir fluidly coupled to one another by the lines. Hydraulic leak warning apparatus, fluidly coupled into the hydraulic fluid reservoir, is constructed to provide a signal indicating a possible hydraulic fluid leak. The invention includes the structure that compensates for changes in the volumes of fluid within the first and second regions as the piston moves within the cylinder so that actuation of the hydraulic actuator has no effect on the fluid level within the reservoir.

7 Claims, 5 Drawing Sheets

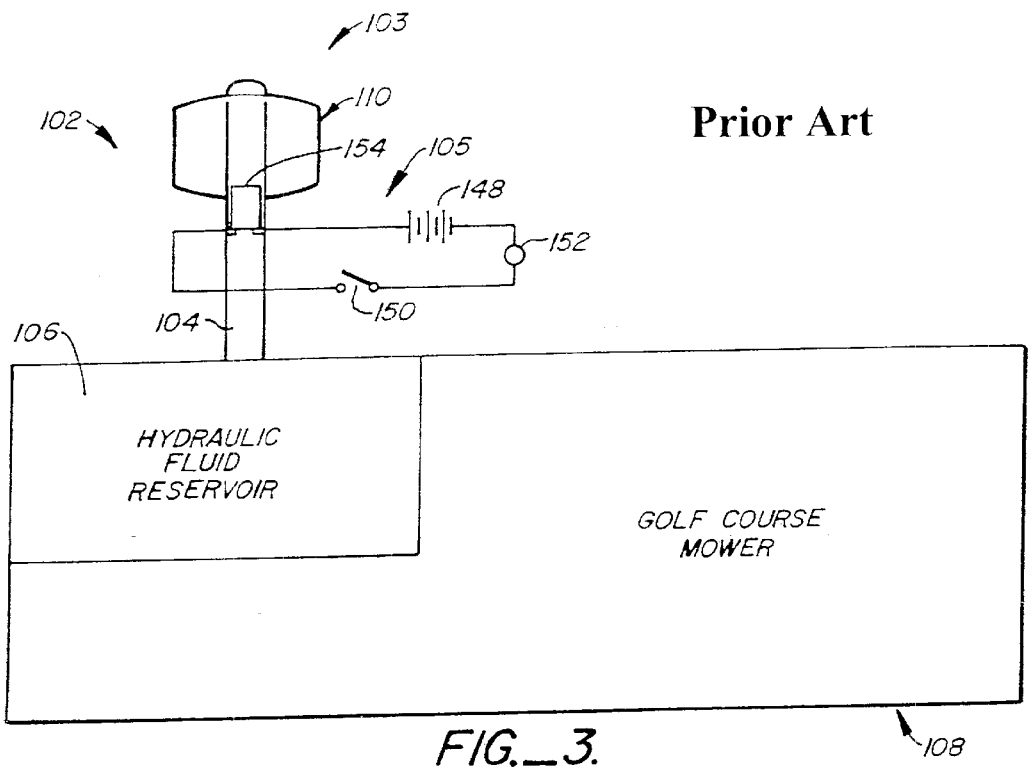
FIG._3.
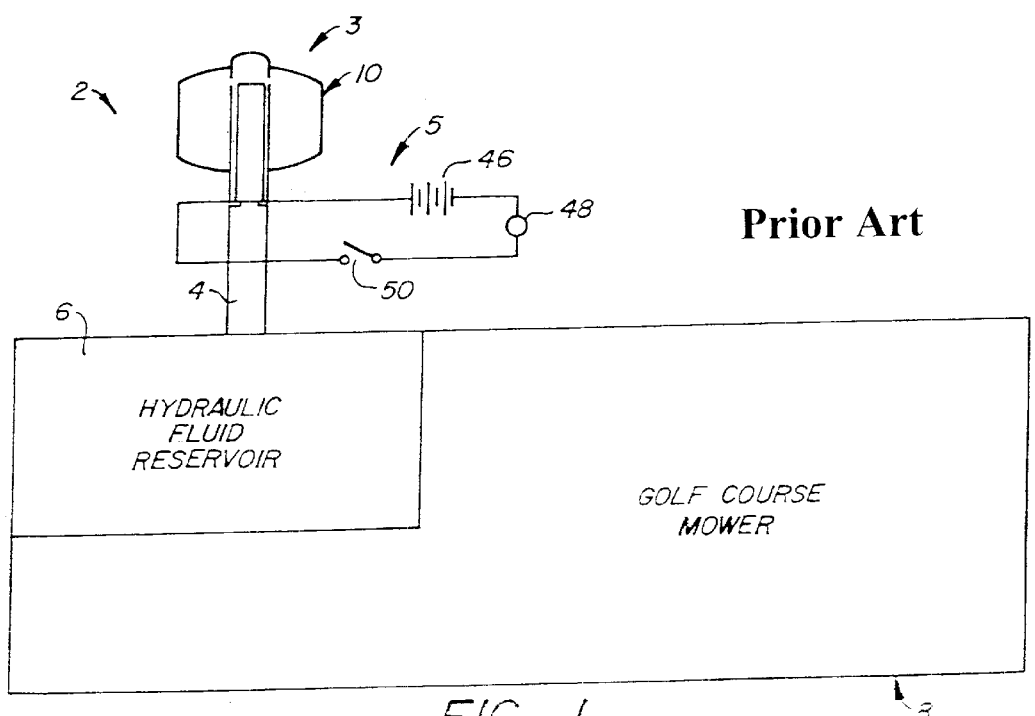
FIG._1.

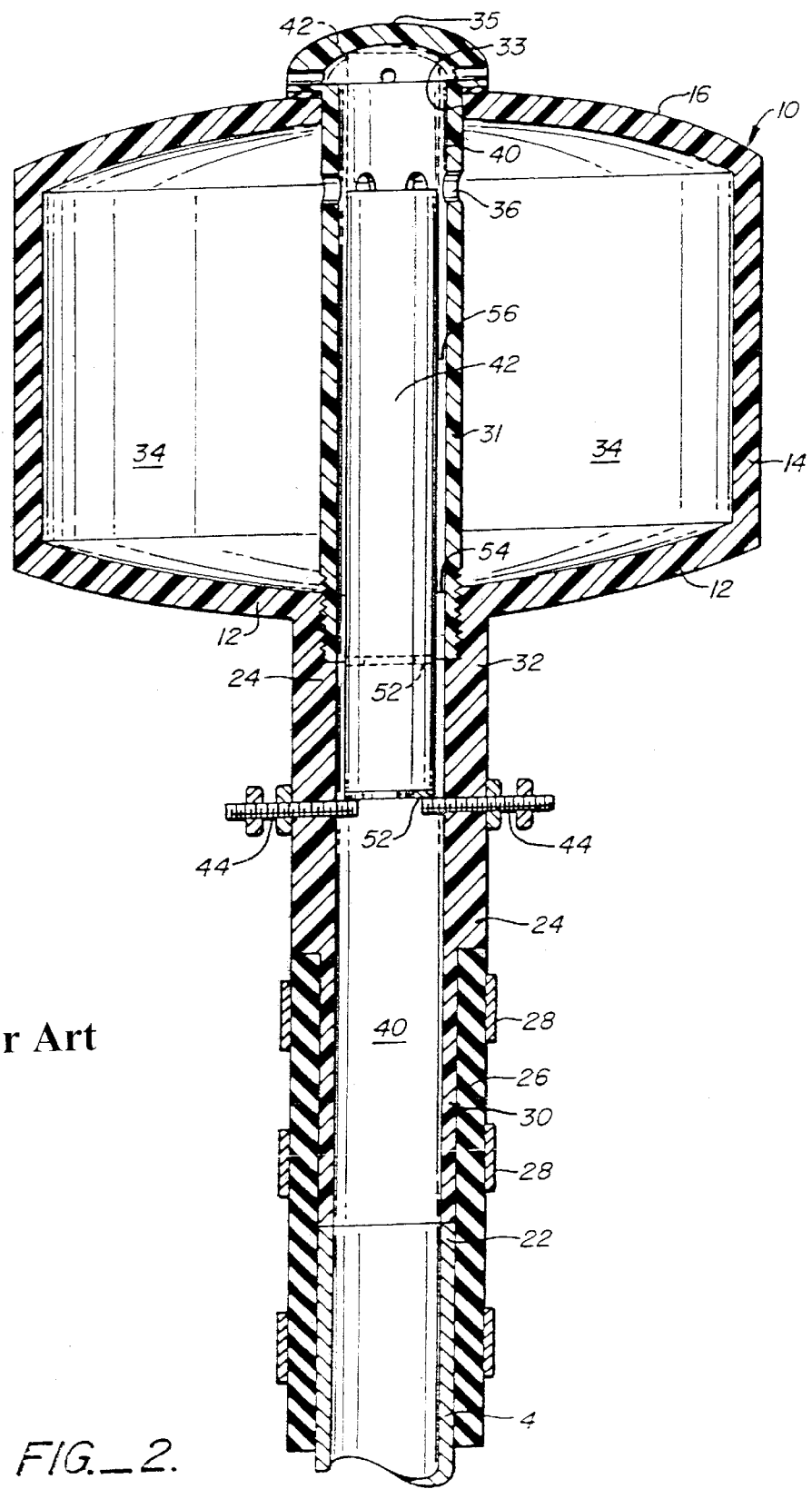
Prior Art
FIG._2.

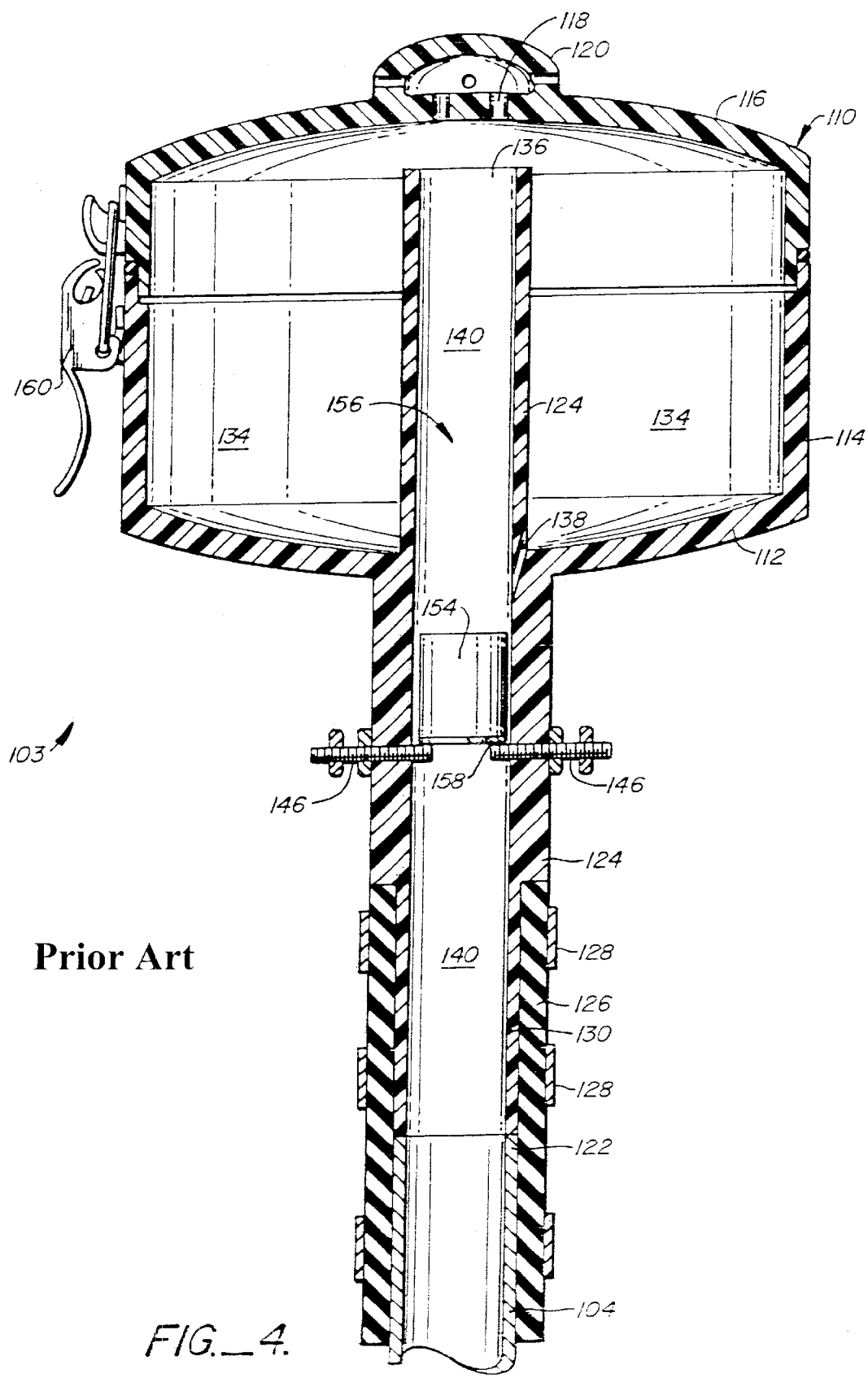
Prior Art
FIG._4.

HYDRAULIC SYSTEM WITH FLUID LEAK WARNING APPARATUS

CROSS-REFERENCE TO OTHER APPLICATION

This application is related to and is an improvement over the invention disclosed in U.S. Pat. No. 4,591,837.

FEDERALLY SPONSORED RESEARCH OR DEVELOPMENT

None.

BACKGROUND OF THE INVENTION

This invention is related to warning systems, particularly apparatus for quickly signaling when a hydraulic system has sprung a leak.

Many types of equipment use hydraulic systems as the power source for various attachments and for their own component parts. For example, some commercial lawn mowers used to cut the grass on golf course greens use pressurized hydraulic fluid to power the cutting reel and to drive the mower's wheels using individual hydraulic motors at each wheel. One problem with hydraulic systems, which is particularly acute with golf course green lawn mowers, is that if the system springs a leak much damage can be done to the golf green by the hot hydraulic fluid before the operator notices the leak.

There are many types of low fluid level warning systems presently available that can be used to alert the operator of a leak in the system. Such sensors commonly detect when the fluid level drops below a set level. Since hydraulic fluid heats up and expands during use, the reservoir fluid level also rises during use. Therefore the set level must be set at a point below the lowest operating level when the fluid is still cool. If the hydraulic system springs a leak while the hydraulic fluid is cool, the sensor will drop below the set level relatively quickly. However, if the leak occurs after the fluid has heated up and expanded during use, a rather large quantity of hydraulic fluid will be lost before the system provides its warning. With slow or moderate leaks this may or may not be catastrophic for a golf course because the fluid would be spread over a large area. However, if a fast leak occurs on a golf green, a substantial volume of hot hydraulic fluid can be deposited in a relatively small area. This can lead to the destruction of a green, which represents a very expensive loss.

SUMMARY OF THE INVENTION

A first aspect of the present invention is directed to an improved hydraulic system of the type comprising a hydraulic fluid reservoir and a hydraulic circuit assembly comprising lines and hydraulic components. The hydraulic components comprise a hydraulic actuator comprising a cylinder, defining an interior, a reciprocating piston within the interior dividing the interior into first and second regions, and a first shaft extending from the piston, through the first region and out through a first opening in the cylinder. At least two of the hydraulic components and the reservoir are fluidly coupled to one another by lines. Hydraulic leak warning apparatus, fluidly coupled into the hydraulic fluid reservoir, is constructed to provide a signal indicating a possible hydraulic fluid leak. The improvement comprises means for compensating for changes in the volumes of fluid within the first and second regions as the piston moves within the cylinder so that actuation of the hydraulic actuator has no effect on the fluid level within the reservoir. The compensating means may comprise a second shaft extending from the piston, through the second region and out through a second opening in the cylinder, the second shaft being sized so that the total fluid volume within the first and second regions remains constant as the piston moves within the cylinder. The compensating means may also comprise a secondary hydraulic ram comprising a secondary cylinder defining secondary interior, a secondary reciprocating piston within the secondary interior, a secondary shaft extending from the secondary piston and out of the secondary cylinder, and a coupler operably coupling the first shaft and the secondary shaft so that movement of the first shaft causes corresponding movement of the secondary shaft.

A second aspect of the present invention is directed to a method for enhancing the operation of a hydraulic leak warning apparatus by stabilizing the amount of hydraulic fluid within a hydraulic fluid reservoir of a hydraulic system. The hydraulic system is of a type comprising a hydraulic fluid reservoir and a hydraulic circuit assembly comprising lines and hydraulic components. The hydraulic components comprise a hydraulic actuator comprising a cylinder, defining an interior, a reciprocating piston within the interior dividing the interior into first and second regions, and a first shaft extending from the piston, through the first region and out through a first opening in the cylinder. At least two of the hydraulic components and the reservoir are fluidly coupled to one another by lines. Hydraulic leak warning apparatus, fluidly coupled into the hydraulic fluid reservoir, is constructed to provide a signal indicating a possible hydraulic fluid leak. The method comprises compensating for any changes in the volumes of fluid within the first and second regions as the piston moves within the cylinder so that actuation of the hydraulic actuator has no effect on the fluid level within the reservoir. The volume change compensating step may comprise extending a second shaft from the piston, through the second region and out through a second opening in the cylinder and sizing the second shaft to have the same cross-sectional area as the first shaft so that the total fluid volume within the first and second regions remains constant as the piston moves within the cylinder. The volume change compensating step may also comprise coupling a secondary shaft of a secondary hydraulic ram to the first shaft, the secondary hydraulic ram further comprising a secondary cylinder defining secondary interior and a secondary reciprocating piston within the secondary interior, the secondary shaft extending from the secondary piston and out of the secondary cylinder, so that movement of the first shaft causes corresponding movement of the secondary shaft.

Various features and advantages of the invention will appear from the following description in which the preferred embodiments have been set forth in detail in conjunction with the accompanying drawings.

BRIEF DESCRIPTION OF THE DRAWINGS

FIG. 1 is a schematic representation of a first conventional leak warning apparatus including an active drainback system and shown mounted to a hydraulic fluid reservoir of a golf course mower.

FIG. 2 is a side cross-sectional view of the liquid level sensor of the warning apparatus of FIG. 1.

FIG. 3 is a schematic representation of a second conventional leak warning apparatus including a passive drainback system and shown mounted to a hydraulic fluid reservoir of a golf course mower.

FIG. 4 is a side cross-sectional view of the liquid level sensor of the warning apparatus of FIG. 3.

DESCRIPTION OF THE SPECIFIC EMBODIMENTS

Figure 5:
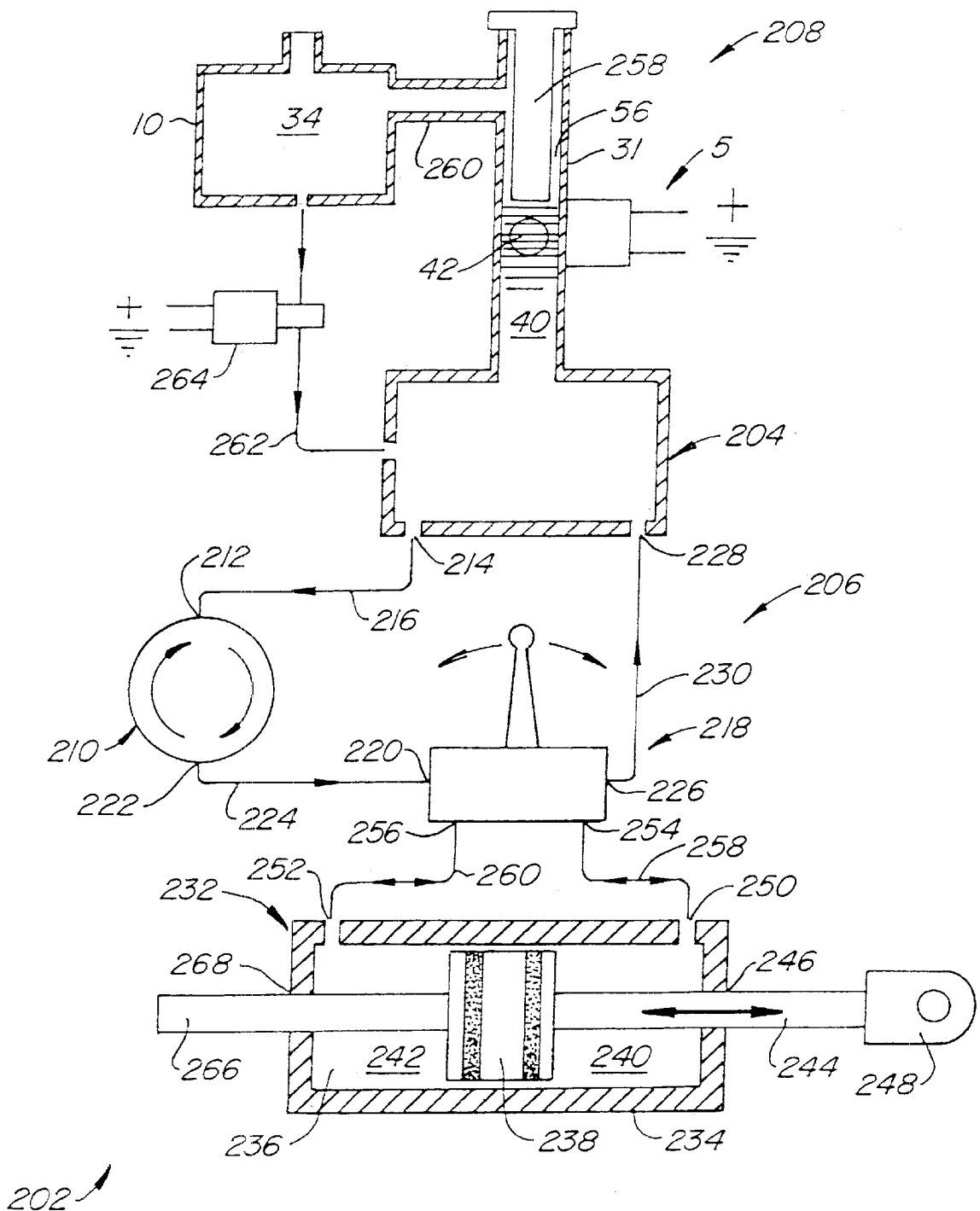
FIG. 5 is a schematic representation of a hydraulic system made according to the invention.

The following is a description of the hydraulic fluid leak warning apparatus 2 disclosed in the present inventor's own U.S. Pat. No. 4,591,837. Accordingly, the apparatus of FIGS. 1–4 is conventional.

Turning to FIG. 1, a first embodiment of a hydraulic fluid leak warning apparatus 2 includes broadly a liquid level sensor 3 and a warning signal assembly 5. Sensor 3 is shown mounted to a reservoir riser pipe 4 to fluidly connect sensor 3 with a hydraulic fluid reservoir 6 on a golf course mower 8.

Referring now to FIG. 2, sensor 3 includes an expansion chamber 10 having a bottom 12, a cylindrical, circumferential sidewall 14 and a top 16. Expansion chamber 10 is supported on the upper end 22 of riser pipe 4 by a connecting pipe 24. A section of flexible hose 26 and hose clamps 28 secure the lower end 30 of pipe 24 to the upper end 22 of riser pipe 4.

A float chamber pipe 31 extends upwardly into and through the interior 34 of expansion chamber 10. Pipe 31 passes through an opening 33 in top 16 and has vented cap 35 at its upper end. Pipe 31 has openings 36 positioned a substantial distance above bottom 12. Openings 36 connect the interior 40, also called float chamber 40, of pipes 31 and 24 with interior 34 of expansion chamber 10.

An elongate float 42 is loosely mounted within float chamber 40 between a pair of electrical terminals 44 and openings 36. Terminals 44 extend through the wall of connecting pipe 24 and are connected in series with a battery 46, a buzzer 48 and an arming switch 50 as shown in FIG. 1. Float 42 has a metal ring 52 mounted to its lower edge so that when ring 52 contacts electrical terminals 44, buzzer 48 sounds when arming switch 50 is closed.

Assuming mower 8 has not been used for a while, such as at the beginning of the day, the fluid in reservoir 6 is relatively cool and contains little air so that it is in an unexpanded state. The operator first grasps cap 35 to unscrew pipe 31 from bottom 12 of chamber 10 and removes pipe 31. The operator then removes float 42 and adds hydraulic fluid if needed, typically to a fill line 54. Float 42 and pipe 31 are then reinserted into chamber 34 and pipe 31 is threaded to bottom 12. Float 42, being quite buoyant, rises to the dashed line position of FIG. 2. Mower 8 is then started which causes hydraulic fluid from reservoir 6 to heat up and expand, primarily by the normal aeration of the hydraulic fluid. This extra volume of hydraulic fluid flows up float chamber 40 through the annular region 56 between float 42 and pipe 31. Because annular region 56 is relatively small, the excess hydraulic fluid quickly moves up float chamber 40 and flows out of openings 36 into interior 34 of expansion chamber 10 where it is held.

While operating, since the hydraulic fluid remains warm and agitated, float 42 remains floating above terminals 44. However, if a leak occurs in the hydraulic system, hydraulic fluid is drained from float chamber 40 which causes float 42 to drop. As the fluid in float chamber 40 drops, float 42 drops until ring 52 rests on terminals 44. This occurs after only a small volume of hydraulic fluid has been lost. This is a significant improvement over prior art sensors in which a volume of liquid equal to the increase in volume of the hydraulic fluid would need to be lost before the float would drop far enough to signal the leak. In fact, it has been found that this first embodiment of the present invention is sensitive enough so that during a 10 or 15 minute break, the hydraulic fluid can cool down sufficiently to cause the fluid level in float chamber 40 to drop enough to lower float 42 onto terminals 44 thus sounding buzzer 48. This, of course, can be eliminated by opening arming switch 50 when mower 8 is not in use. However, once the mower 8 is restarted, the volume of hydraulic fluid quickly heats up and expands to its prior state, thus refloating float 42.

After use the hydraulic fluid held within interior 34 is drained back into reservoir 6 through pipe 24 and riser 4 by removing pipe 31. Thus, sensor 3 is provided with an active drainback system in which the excess volume of hydraulic fluid remains within expansion chamber 34 until someone actively does something to allow it to drain back into reservoir 6. Other structures for selectively fluidly connecting the bottom of expansion chamber 34 with reservoir 6 could also be used. For example, a separate valved passageway between the bottom of interior 34 and either the interior of connecting pipe 24 or fluid reservoir 6 may be provided. (See, for example, FIG. 5.) However, applicant has found it advantageous to require the operator to remove float chamber pipe 31 and float 42 before starting mower 8. Doing so acts as a reminder to check the hydraulic fluid level and top off if needed.

Turning now to FIG. 3, a second embodiment of a hydraulic fluid leak warning apparatus 102 is shown to include broadly a liquid level sensor 103 and a warning signal assembly 5. Sensor 103 is shown mounted to a reservoir riser pipe 4 to fluidly connect sensor 103 with a hydraulic fluid reservoir 6 on a golf course mower 8.

Referring also to FIG. 4, sensor 103 includes an expansion chamber housing 110 having a bottom 112, a cylindrical, circumferential sidewall 114 and a removable top 116. Top 116 has vent holes 118 covered by a vented cap 120. Housing 110 is supported on the upper end 22 of riser pipe 4 by a float chamber pipe 124. A section of flexible hose 26 and hose clamps 28 secure the lower end 30 of pipe 124 to the upper end 22 of riser pipe 4.

Float chamber pipe 124 extends upwardly into the expansion chamber 134 within expansion chamber housing 110. Pipe 124 has an open top 136 positioned a substantial distance above bottom 112. A constricting passageway 138 is formed through the wall of pipe 124 adjacent bottom 112. Passageway 138 provides a narrow fluid path between the interior 140, also called the float chamber 40, of float chamber pipe 124 and expansion chamber 134.

When mower 108 has been idle for some time, so that the hydraulic fluid is cool, the level of the fluid in expansion chamber 134, and thus float chamber 140, is at a low point. After mower 108 has run for a while, the hydraulic fluid heats up and becomes agitated so that the levels of the hydraulic fluid within float chamber 40 rises. Hydraulic fluid passes into expansion chamber 134 both through passageway 138 and by overflowing open top 136.

Signal assembly 5 alerts the operator when the hydraulic system of mower 8 has sprung a leak. Assembly 5 includes a pair of electrical terminals 44 extending through the wall of float chamber pipe 124 into float chamber 40, a battery 46, an arming switch 50 and a buzzer 48 all connected by appropriate wiring. A float 154 is housed within float chamber 40. Float 154 is sized to fit loosely within chamber 40. Float 154 has a metal ring 52 along its lower edge. When the hydraulic fluid within float chamber 40 drops sufficiently, float 154 electrically connects electrical terminals 44 through ring 52.

Before use of this second embodiment of the invention, the operator first removes top 116 and checks to insure float 154 is floating just above electrical terminal 44. If it is not, but rather is resting n terminals 44, upon closing switch 50 buzzer 48 will sound alerting the operator that additional hydraulic fluid must be added. This condition will alert the operator that there may be a very slow leak in the system. If float 154 is floating above terminals 44, the operator can test signal assembly 5 by closing switch 50 and manually pushing float 154 down to contact terminals 44. After adding any necessary hydraulic fluid, top 116 is then replaced and secured to sidewall 114 using clamps 160.

During use the hydraulic fluid heats up so that it expands and rises within float chamber 40, passes through constricting passageway 138 and into expansion chamber 134. If a fast leak occurs, the hydraulic fluid within float chamber 40 will be drained into reservoir 6 much faster than fluid within expansion chamber 134 can pass through constricting passageway 138. Float 154 will quickly drop to contact terminals 44 thus alerting the operator of the leak before very much hydraulic fluid has been lost. The operator then can shut down the mower and remove it to a place where the hydraulic fluid will not cause as much damage.

If a relatively slow leak occurs, that is a leak flowing at a rate about equal to or less than the rate of flow through constricting passageway 138, much more hydraulic fluid must be lost before a warning signal is produced compared with the first embodiment described above. Since a slow leak is usually spread over a large area, damage to the turf would be moderate or slight.

FIG. 5 illustrates a hydraulic system 202 made according to the invention. System 202 includes a hydraulic fluid reservoir 204 connected to a hydraulic circuit assembly 206 and to a hydraulic leak warning apparatus 208. Assembly 206 includes a hydraulic pump 210 having an inlet 212 connected to a first port 214 of reservoir 204 by a line 216. Assembly 206 also includes a two-way hydraulic control valve 218 having an inlet 220 connected to an outlet 222 of pump 210 by a line 224. Valve 218 also has an outlet 226 connected to a second port 228 of reservoir 204 by a line 230. Assembly 206 also includes a hydraulic actuator 232 comprising a cylinder 234 defining an interior 236 housing a piston 238. Piston 238 divides the interior 236 into a first portion 240 and a second portion 242. The actuator 232 also includes a first shaft 244 extending from piston 230 and passing through first portion 240 and a first opening 246 in cylinder 234. The outer end 248 of shaft 244 is typically connected to a part or component driven or positioned by hydraulic system 202. Cylinder 234 has first and second ports 250, 252 opening into first and second portions 240, 242. Ports 250, 252 are coupled to ports 254, 256 of control valve 218 by lines 258, 260.

Hydraulic leak warning apparatus 208 is similar to that disclosed above with reference to FIGS. 1 and 2 with like reference numerals referring to like elements. Element 258 is a combination volume displacer and vented fill cap. Float chamber 40 is coupled to interior 34 of expansion chamber 10 by an overflow line 260. A bypass line 262 automatically opens to allow the contents of expansion chamber 10 to flow back into reservoir 204 when the ignition is turned off, as indicated by switch 264 along line 262.

The above-described structure of FIG. 5 is generally conventional. One aspect of the present invention is the recognition that it would be desirable to maintain a constant amount of hydraulic fluid within reservoir 204 during the operation of the equipment, such as a greens mower, to help improve the operational sensitivity of a hydraulic leak warning apparatus, such as disclosed in this application or otherwise. In the embodiment of FIG. 5, this is accomplished by providing actuator 232 with a second shaft 266 extending from piston 238, through second portion 242 of interior 236, and through a second opening 268 in cylinder 234. First and second shafts 244, 266 have the same diameter so that the total volume of fluid within first and second portions 240, 242 does not change as piston 238, and first and second shafts 244, 246 therewith, reciprocates.

Figure 6:
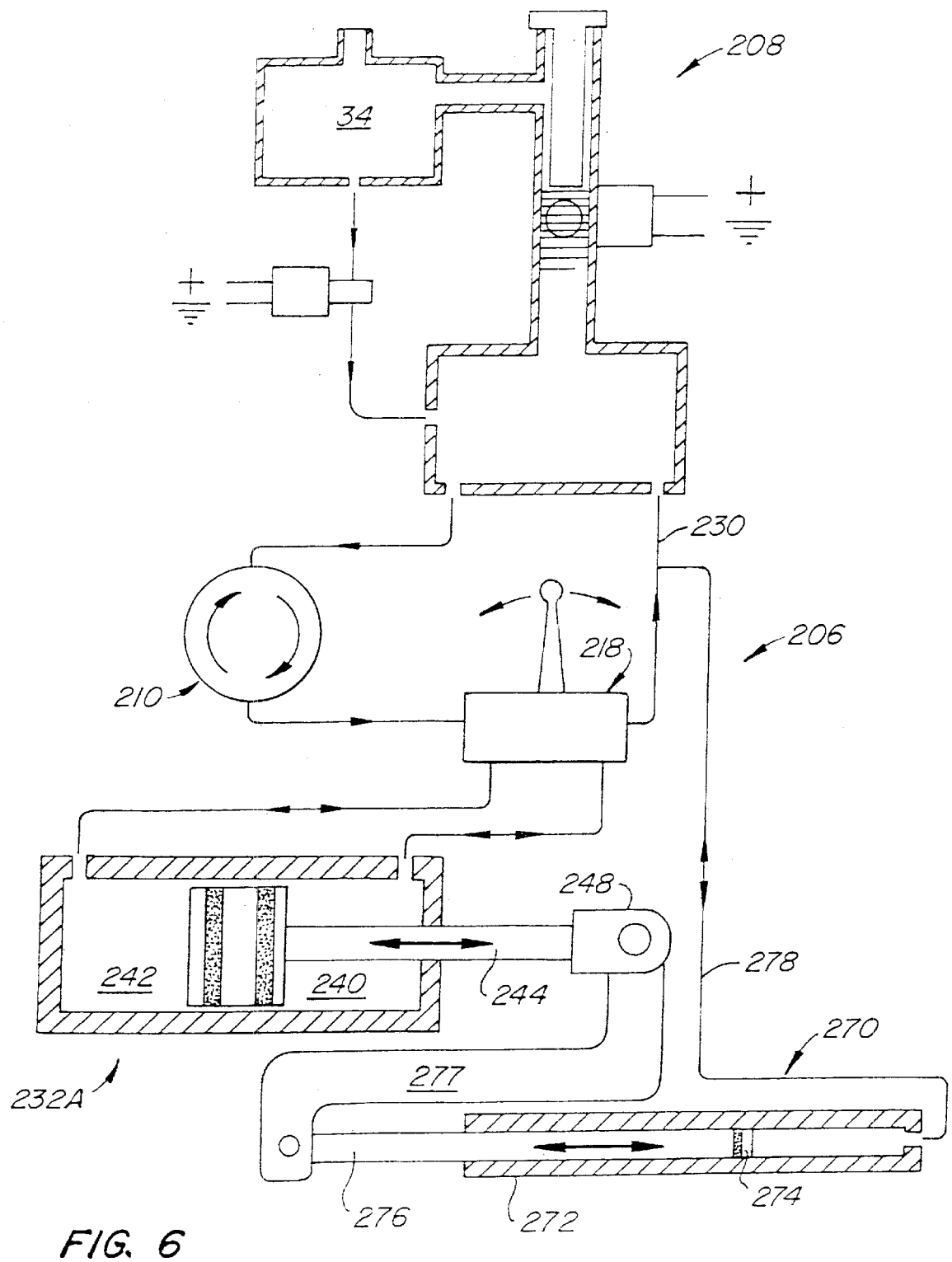
FIG. 6 is a schematic representation of an alternative embodiment of the hydraulic system of FIG. 5.

The embodiment of FIG. 6 is substantially the same as that of FIG. 5, with like reference numerals referring to like elements, with hydraulic actuator 232A being a conventional single shaft hydraulic cylinder. Therefore, movement of piston 238 to the right in FIG. 6 causes as a smaller volume of fluid to flow out of port 250 than into port 252. The fluid-compensating function served by shaft 266 in the FIG. 5 embodiment is achieved by a secondary hydraulic ram 270. Ram 270 includes a cylinder 272 containing a piston 274 connected to a shaft 276. The shaft 276 is connected to outer end 248 of shaft 244 by a link 277 so that movement of piston 238 and shaft 244 therewith causes like movement of piston 274. The piston 274 has the same diameter as shaft 244. Cylinder 272 is coupled to line 230 by a line 278. Using secondary hydraulic ram 270 in this manner causes fluid from ram 270 to be injected into line 230 when piston 238 is driven to the right thus compensating for the extra fluid being withdrawn from reservoir 204 and into portion 242. Movement of piston 238 to the left in FIG. 6 causes the reverse compensating fluid flow.

Modification and variation can be made to the disclosed embodiments without departing from the subject of the invention as defined in the following claims. For example, hydraulic leak warning apparatus other than those disclosed therein may be used with the present invention. In the embodiment of FIG. 6 there is a one-to-one correspondence between the movement of pistons 238 and 274; a different ratio of movement may be accommodated by changing the cross-sectional areas of shaft 244 and piston 274. Second shaft 266 could be replaced by other volume-compensating structures, such as a telescoping shaft housed completely within portion 242.

Any and all patents, patent applications and printed publications referred to above are incorporated by reference.

I claim:

1. A hydraulic system of the type comprising:
    a hydraulic fluid reservoir;
    a hydraulic circuit assembly comprising lines and hydraulic components, at least two of the hydraulic components and the reservoir fluidly coupled to one another by the lines, the hydraulic components comprising:
        a hydraulic pump;
        a hydraulic actuator comprising a cylinder, defining an interior, a reciprocating piston within the interior dividing the interior into first and second regions, and a first shaft extending from the piston, through the first region and out through a first opening in the cylinder; and
        hydraulic valving selectively coupling the pump and the reservoir to the first and second regions so to selectively drive the piston and the shaft therewith; and
    hydraulic leak warning apparatus, fluidly coupled into the hydraulic fluid reservoir, constructed to provide a signal indicating a possible hydraulic fluid leak, the improvement comprising:

means for compensating for changes in the volumes of fluid within the first and second regions as the piston moves within the cylinder so that actuation of the hydraulic actuator has no effect on the fluid level within the reservoir.

2. The system according to claim 1 wherein the compensating means comprises a second shaft extending from the piston, through the second region and out through a second opening in the cylinder, the second shaft being sized so that the total fluid volume within the first and second regions remains constant as the piston moves within the cylinder.

3. The system according to claim 1 wherein the compensating means comprises a secondary hydraulic ram comprising a secondary cylinder defining secondary interior, a secondary reciprocating piston within the secondary interior, a secondary shaft extending from the secondary piston and out of the secondary cylinder, and a coupler operably coupling the first shaft and the secondary shaft so that movement of the first shaft causes corresponding movement of the secondary shaft.

4. The system according to claim 3 wherein the first shaft and the secondary piston have equal cross-sectional areas so that movement of the first shaft causes equal movement of the second shaft.

5. A method for enhancing the operation of a hydraulic leak warning apparatus by stabilizing the amount of hydraulic fluid within a hydraulic fluid reservoir of a hydraulic system, the hydraulic system of a type comprising: a hydraulic fluid reservoir; a hydraulic circuit assembly comprising lines and hydraulic components, at least two of the hydraulic components and the reservoir fluidly coupled to one another by the lines, the hydraulic components comprising: a hydraulic pump; a hydraulic actuator comprising a cylinder, defining an interior, a reciprocating piston within the interior dividing the interior into first and second regions, and a first shaft extending from the piston, through the first region and out through a first opening in the cylinder; and hydraulic valving selectively coupling the pump and the reservoir to the first and second regions so to selectively drive the piston and the shaft therewith; and hydraulic leak warning apparatus, fluidly coupled into the hydraulic fluid reservoir, constructed to provide a signal indicating a possible hydraulic fluid leak, the method comprising:

compensating for any changes in the volumes of fluid within the first and second regions as the piston moves within the cylinder so that actuation of the hydraulic actuator has no effect on the fluid level within the reservoir.

6. The method according to claim 5 wherein the volume change compensating step comprises:

extending a second shaft from the piston, through the second region and out through a second opening in the cylinder; and sizing the second shaft to have the same cross-sectional area as the first shaft so that the total fluid volume within the first and second regions remains constant as the piston moves within the cylinder.

7. The method according to claim 5 wherein the volume change compensating step comprises coupling a secondary shaft of a secondary hydraulic ram to the first shaft, the secondary hydraulic ram further comprising a secondary cylinder defining secondary interior and a secondary reciprocating piston within the secondary interior, the secondary shaft extending from the secondary piston and out of the secondary cylinder, so that movement of the first shaft causes corresponding movement of the secondary shaft.

* * * * *